United States Patent [19]

Straub

[11] 4,437,696
[45] Mar. 20, 1984

[54] MOVABLE TRUCK BUMPER

[76] Inventor: Gerald J. Straub, 6969 Madden Rd., Dexter, Mich. 48130

[21] Appl. No.: 309,929

[22] Filed: Oct. 9, 1981

[51] Int. Cl.³ ............................................. B60R 19/04
[52] U.S. Cl. .................................. 293/118; 187/9 R; 280/481
[58] Field of Search ............................ 293/118, 9, 10; 280/481; 187/1 R, 9 R, 29 A

[56] References Cited

U.S. PATENT DOCUMENTS

| | | | |
|---|---|---|---|
| 1,208,204 | 12/1916 | Poimiroo et al. | 293/34 |
| 2,431,495 | 11/1947 | Mosser | 280/33.13 |
| 2,653,678 | 9/1953 | Lehrman | 187/9 R |
| 3,043,401 | 7/1962 | Hallene et al. | 187/1 R |
| 3,079,176 | 2/1963 | Duke et al. | 280/481 |
| 3,184,253 | 5/1965 | Bratton | 280/481 |
| 3,198,551 | 8/1965 | Garner | 293/118 |
| 3,252,716 | 5/1966 | Gaterman | 280/479 |
| 3,332,562 | 7/1967 | Kokott | 280/41 |
| 3,332,562 | 7/1967 | Kokott | 214/86 |
| 3,818,302 | 6/1974 | Rutledge | 187/9 R |
| 3,907,353 | 9/1975 | Dinitz | 293/81 |
| 4,015,685 | 4/1977 | Lenz | 187/9 R |
| 4,026,590 | 5/1977 | Holm | 293/73 |
| 4,130,183 | 12/1978 | Tjornemark | 187/9 R |
| 4,269,285 | 5/1981 | Ohkoshi et al. | 187/9 R |

FOREIGN PATENT DOCUMENTS

| | | | |
|---|---|---|---|
| 728548 | 2/1966 | Canada | 187/9 R |
| 55-83635 | 6/1980 | Japan | 293/102 |
| 848868 | 9/1960 | United Kingdom | 187/9 R |

Primary Examiner—Joseph F. Peters, Jr.
Assistant Examiner—Ross Weaver
Attorney, Agent, or Firm—James M. Deimen

[57] ABSTRACT

The invention comprises an improved movable truck bumper that can be raised and lowered vertically from inside the cab of the truck to which the bumper is attached. The bumper includes an electrical control inside the cab to raise and lower the bumper and to signal the bumper height to the operator. The operator can thereby ascertain the height of the bumper without exiting the cab or viewing the bumper with mirrors. In the preferred embodiment, lights identifying the correct bumper heights for various automobile models or body styles are mounted in a control box with the height control adjacent the operator.

The mechanical portion of the bumper comprises a vertical support frame attached to the vehicle frame in place of the standard bumper and a vertically movable lift frame nested onto the support frame. A vertically mounted hydraulic cylinder is substantially nested within the support and lift frames providing an exceptionally compact structure that can be mounted very close to the front of the vehicle.

11 Claims, 9 Drawing Figures

MOVABLE TRUCK BUMPER

BACKGROUND OF THE INVENTION

The field of the invention pertains to automotive trucks with movable bumpers and, in particular, to truck bumpers that can be moved vertically to accommodate the various heights of automobile bumpers. Such bumpers can, of course, be used to push other vehicles with varying bumper heights. The field of the invention also includes various cushioning devices to prevent damage to the bumpers or the vehicles to which the bumpers are attached.

The most commonly employed means for raising and lowering a bumper or snow plow blade are illustrated in U.S. Pat. Nos. 3,332,562 and 3,252,716 respectively. Such devices employ forwardly extending pivotally mounted arms and a diagonally mounted hydraulic cylinder to raise and lower the bumper or blade. An adjustable length chain connects the upper cylinder actuated arm to the blade or bumper.

Much earlier pivoting bumpers are illustrated in U.S. Pat. Nos. 1,208,204 and 2,431,495. Such bumpers utilized supports and actuation means extending longitudinally beneath or above the front axle of the vehicle and were very cumbersome.

Cushioning means for bumpers are illustrated in U.S. Pat. Nos. 3,079,176 and 3,184,253. In the former, the cushioning means are positioned between the bumper and the front of a crawler tractor. The cushioning means reduce the shock of sudden impact with the pushed vehicle. In the latter the cushioning means, in addition to reducing shock loading, also accommodate misalignment between the vehicles thereby reducing stresses in the bumper frames and the tendency to lift vehicle wheels from the ground.

U.S. Pat. Nos. 3,907,353 and 4,026,590 illustrate movable rear truck bumpers to prevent under-ride of following vehicles in the event of a collision. The former may be adjusted vertically by manually adjusting the supporting struts. The latter is not adjustable but rather pivotally folds to provide clearance as the truck body is tilted.

The bumper devices disclosed extend substantial distances in front of or behind the vehicles. The additional length added to the vehicles reduces the maneuverability of the vehicles substantially in proportion to the additional length. The height adjustable bumpers require that the operator exit the vehicle cab or view with mirrors the bumper to ascertain the height thereof. Both methods are cumbersome and time consuming. With a view toward overcoming such deficiencies in the prior art, applicant has invented the bumper disclosed herein.

SUMMARY OF THE INVENTION

The invention comprises an improved movable truck bumper that can be raised and lowered vertically from inside the cab of the vehicle to which it is attached. The bumper includes an electrical control inside the cab to raise and lower the bumper and to signal the bumper height to the operator. The operator can thereby ascertain the height of the bumper without exiting the cab or viewing the bumper with mirrors. In the preferred embodiment, lights identifying the correct bumper heights for various automobile models or body styles are mounted in a control box with the height control adjacent the operator.

The mechanical portion of the bumper comprises a vertical support frame attached to the vehicle frame in place of the standard bumper and a vertically movable lift frame nested onto the support frame. A vertically mounted hydraulic cylinder is substantially nested within the support and lift frames providing an exceptionally compact structure that can be mounted very close to the front of the vehicle.

The lift frame includes a horizontal socket with vertical drop pins to accommodate a variety of selectable bumper cushioning means and to provide for easy replacement in the event of damage to the cushioning means. The wheeled cushioning means illustrated herein provide exceptional protection against damage to the rear bumpers of modern passenger automobiles. Such cushioning means mounted on conventional vertically movable bumper assemblies results in undue lengthening of the vehicle and excessive overhang beyond the front of the vehicle. The undue overhang reduces the stability and maneuverability of the vehicle and may place undue stress on the vehicle frame.

Applicant's vertical lift frame eliminates the undue overhang problem of wheeled cushioning means, however, more conventional wooden, metal or rubber cushioning means may also be used with the bumper. In such cases the applicant's vertical lift frame adds a negligible amount to the vertical length beyond that of the nonmovable original equipment bumper.

DESCRIPTION OF THE PREFERRED EMBODIMENTS

Figure 1:
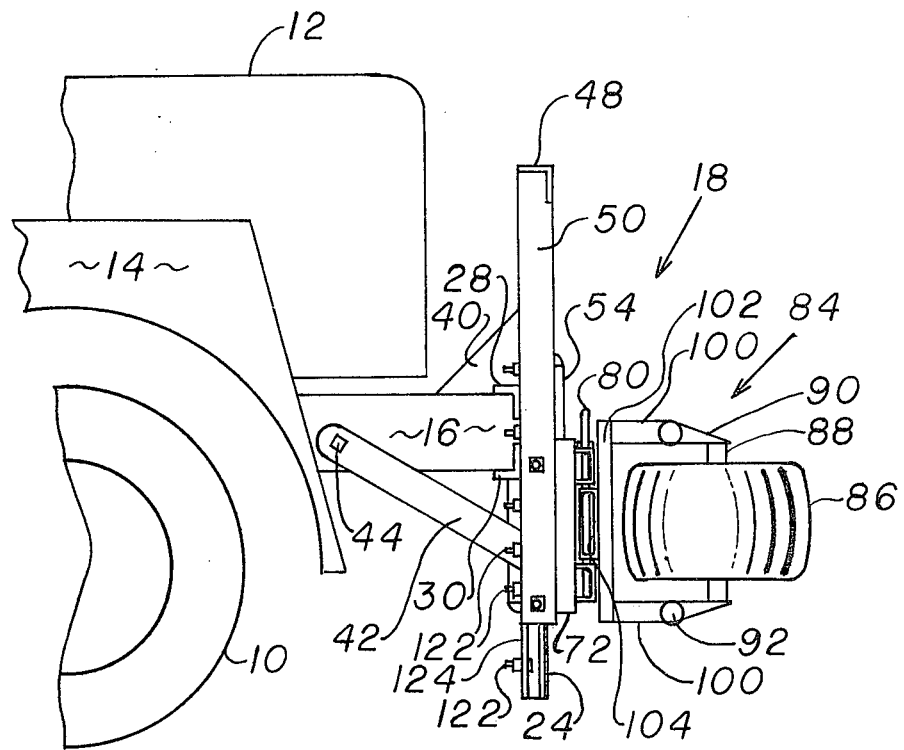
FIG. 1 is a side view of the bumper mounted on the front end of a vehicle.
Figure 2:
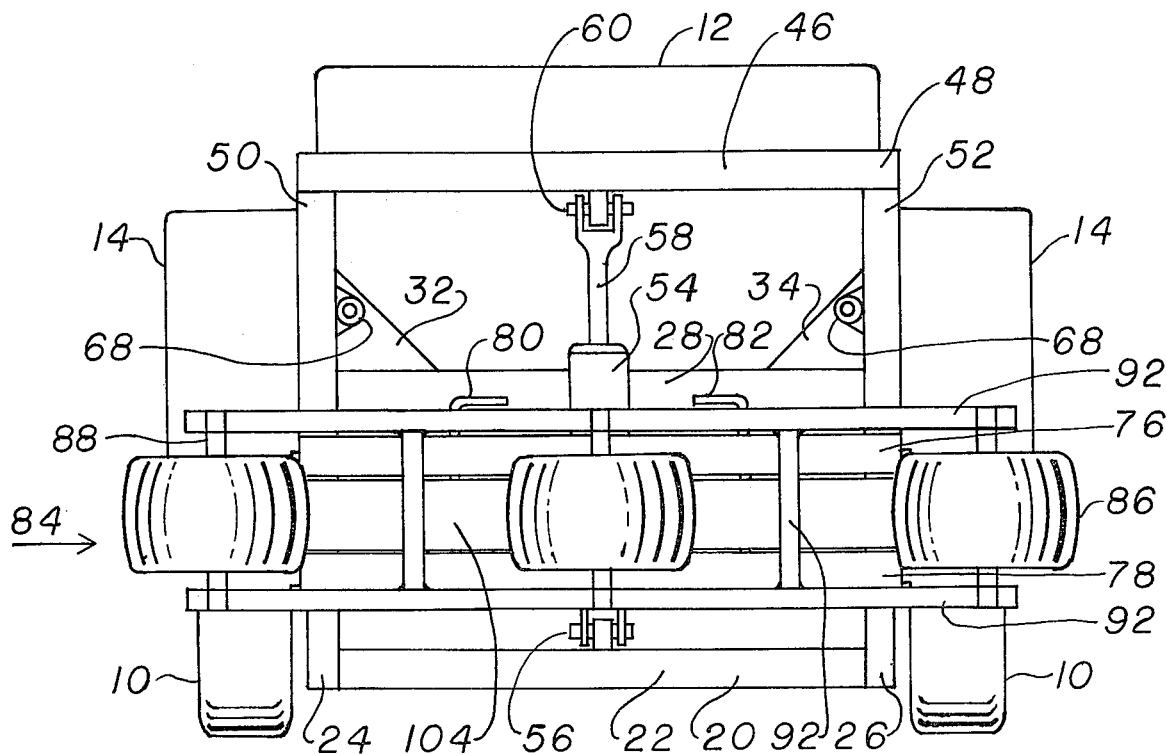
FIG. 2 is a front view of the bumper of FIG. 1.

In FIGS. 1 and 2 the front end of a vehicle such as a truck is illustrated including the front wheels 10, hood 12 and fenders 14. Extending on each side of the truck from under the hood 12 and grill are a pair of frame horns 16 to which the original equipment bumper is normally attached and which has been removed to permit the installation of the vertically movable bumper generally denoted by 18 here illustrated.

Figure 3:
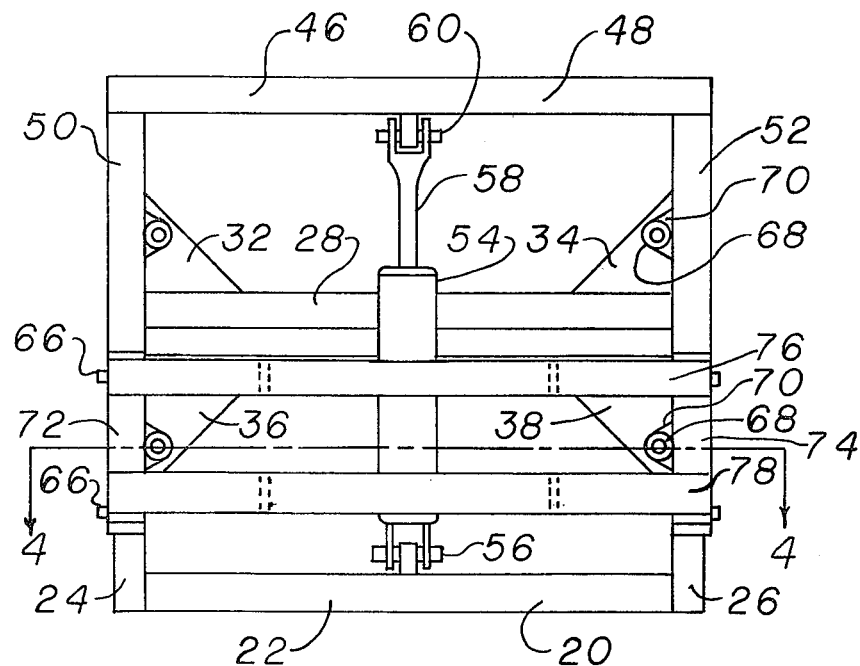
FIG. 3 is a front view of the bumper frame.
Figure 4:
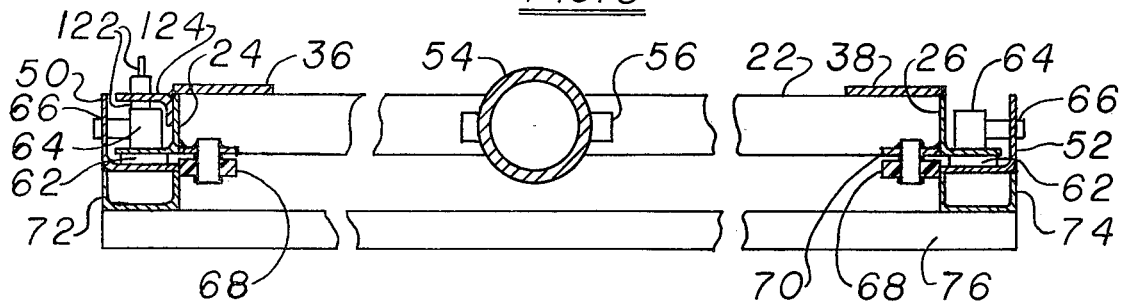
FIG. 4 is a cutaway plan view of the bumper frame taken along the line 4—4 of FIG. 3.

Referring also to FIGS. 3 and 4 the bumper 18 comprises a lift base 20 having a bottom steel horizontal member 22 and two vertical steel angles 24 and 26 welded thereto. Fastened across the ends of the frame horns 16 are a pair of frame adapters 28 and 30. The frame adapters 28 and 30 are welded to the vertical angles 24 and 26. Triangular welded stiffening gussets 32, 34, 36 and 38 join the vertical angles to the frame adapters as shown. Two additional gussets 40 join the vertical angles 24 and 26 to the frame horns 16 from above the frame adapter 28. Below the frame adapter 30, bracket arms 42 extend from the vertical angles 24 and 26 to the frame horns 16 and are bolted thereto at 44.

Mounted on the lift base 20 is the lift frame 46 comprising a top horizontal member 48 and two vertical angles 50 and 52. The lift frame 46 is moved vertically and vertically supported by an hydraulic cylinder 54 pinned to the bottom horizontal member 23 as shown at 56 with cylinder rod 58 pinned to the top horizontal member 48 at 60 also as shown.

The guide means for the lift frame 46 comprises a plurality of pads 62 located between the lift frame vertical angles 50 or 52 and the lift base vertical angles 24 or 26 as best shown in FIG. 4. These pads 62 transmit the horizontal forces generated when the bumper is pushing a second vehicle. Preferably the plastic pads 62 are made of "DELRIN", a product of E. I. du Pont de Neumors, Wilmington, Del. The pads 62 may be adhesively or mechanically fastened to either the lift frame vertical angles or the lift base vertical angles.

The guide means further comprise a plurality of rollers 64 attached to 66 the vertical angles 50 and 52 and engaging the vertical angles 24 and 26 respectively as best shown in FIG. 4. The combination of the "DELRIN" pads 62 and the rollers 64 retain the lift frame in fore and aft alignment.

A second set of rollers 68 are mounted on gussets 70 in turn attached to the vertical angles 24 and 26. The rollers 68 engage the vertical angles 50 and 52 to provide lateral alignment of the lift frame 46 on the lift base 20.

Welded to the vertical lift frame angles 50 and 52 respectively are a pair of short channels 72 and 74. Extending across the lift frame 46 are a pair of channels 76 and 78 spaced apart and welded to the channels 72 and 74. Vertical pins 80 and 82 pass through vertical holes in the pair of channels 76 and 78 to removably retain a bumper assembly and cushioning means as generally denoted by 84 in FIGS. 1 and 2.

The cushioning means 84 in FIGS. 1 and 2 comprises three low pressure rubber tires 86 mounted on shafts 88 in turn welded to brackets 90 extending from a pipe frame 92. The pipe frame 92 is supported by welded brackets 100 extending from vertical supports 102. The vertical supports 102 in turn are welded to a box section 104 extending laterally behind the tires 86 and fitting between the channels 76 and 78. The entire cushioning means 84 is retained to the vertically movable lift frame 46 by the removable pins 80 and 82 which pass through the box section 104 as well as the channels 76 and 78.

Figures 5, 6:
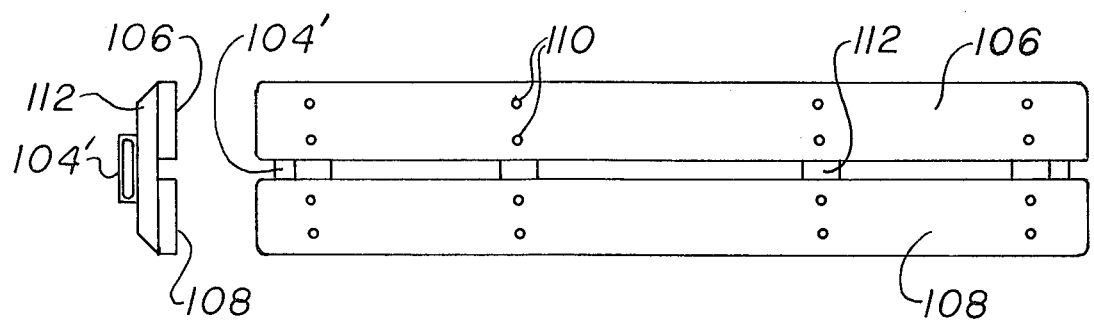
FIG. 5 is a front view of an alternate bumper cushioning means.
FIG. 6 is an end view of the alternate bumper cushioning means of FIG. 5.

The rubber tires 86 of FIGS. 1 and 2 provide maximum protection against damage to a vehicle being pushed, however, other cushioning means may be easily substituted as needed. FIGS. 5 and 6 illustrate a common plank cushioning means. Two heavy wooden planks 106 and 108 are bolted 110 to vertical channels 112. The vertical channels 112 in turn are welded to a box section 104' that is sized to fit between and be pinned to channels 76 and 78 in the same manner as with cushioning means 84 above.

Figure 7:
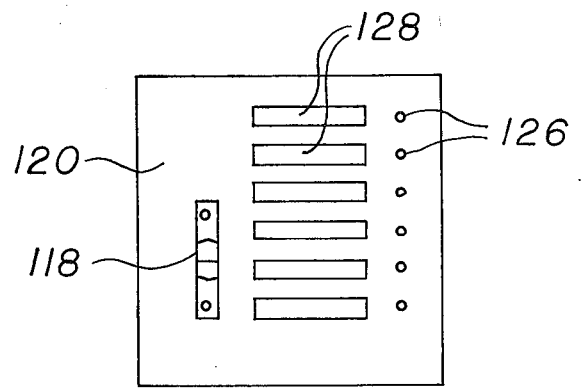
FIG. 7 is a top view of the remote control box in the cab of the vehicle.
Figure 8:
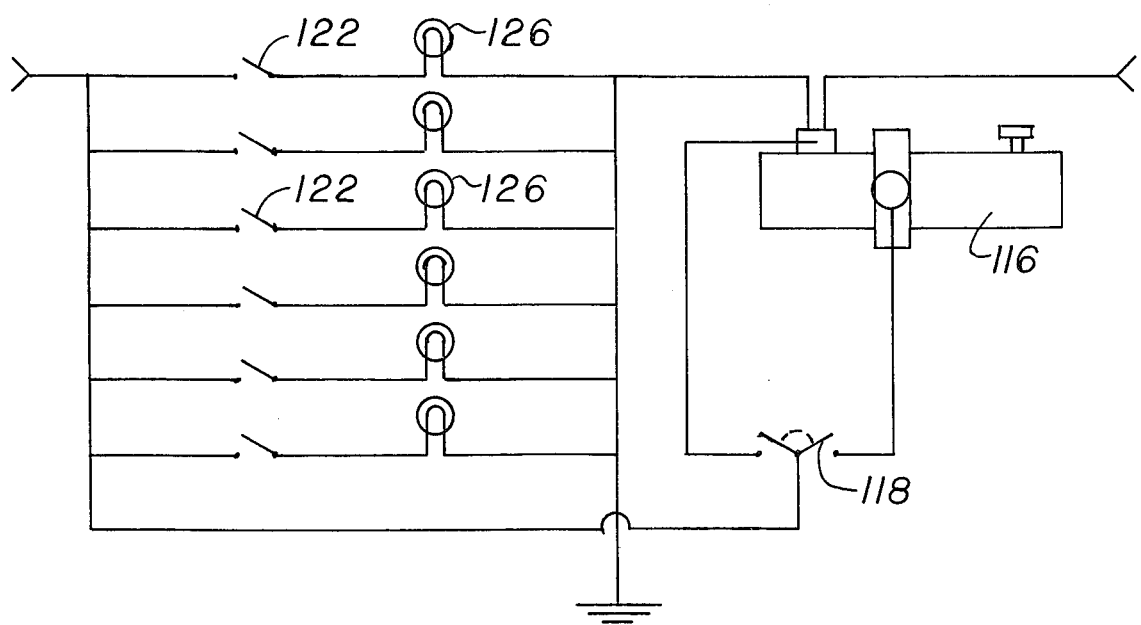
FIG. 8 is an electrical schematic for the remote control of the bumper.
Figure 9:
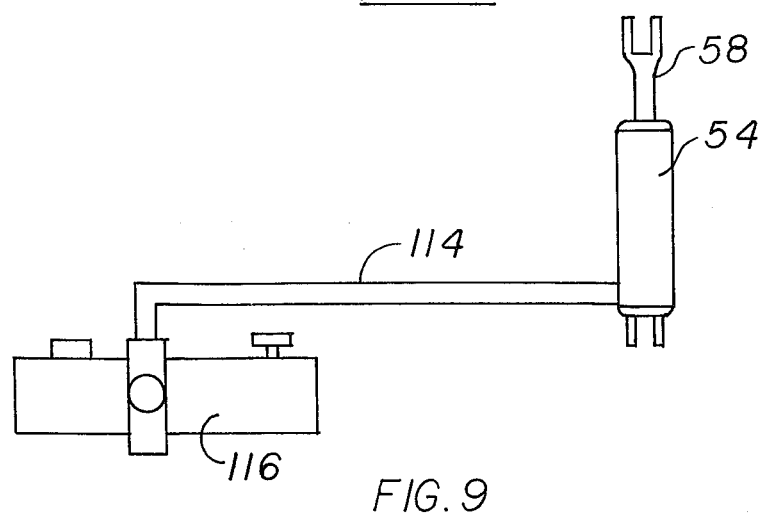
FIG. 9 is a schematic of the hydraulic circuit of the bumper.

FIGS. 7, 8 and 9 illustrate the electric and hydraulic means for operating the bumper. The hydraulic cylinder 54 (Energy Cylinder, Energy Manufacturing Corp., Monticello, Iowa) that raises and supports the vertical lift frame is connected 114 by conduits to an electrically powered self contained hydraulic pump or power pack 116 (Stone Hydraulic Unit Mod. No. 801-257 supplied by Maxon Industries, Los Angeles, Calif.

The power pack 116 is actuated by a rocker switch 118 mounted in a control box 120 in turn located adjacent the operator in the cab of the vehicle. In the rocker switch "up" position the power pack is actuated to hydraulically power the cylinder 54 and raise the lift frame 46. In the "down" position a drop solenoid in the power pack releases the hydraulic pressure in the conduit 114 allowing the weight of the lift frame to lower the cylinder rod 58 and the hydraulic fluid to flow back into the reservoir of the power pack 116. Alternatively a double acting hydraulic power pack and cylinder could be substituted for a positive downward force on the lift frame 46.

Returning to FIGS. 1 and 4 a plurality of switches 122 are mounted in vertical array on an angle 124 in turn welded to vertical angle 24 of the lift base 20. The switches are actuated by either the lower or upper left hand roller 64 as it contacts the switch. Truck backup light switches or other weather proof contact switches may be utilized. The vertical elevation of each switch 122 corresponds to a particular bumper height, suitable for pushing a particular automobile or truck model.

Actuation of a particular switch 122 causes a corresponding light 126 on the control box 120 to glow thus signalling the operator the height of the bumper as follows. Adjacent each light 126 is a tag 128 designating the car model, body style or bumper height in inches of the bumper above the pavement. Typically, the tags 128 may identify "X" body, "K" body, "J" body, etc. Thus, the operator need only identify by sight from the cab, the body type of the vehicle he is planning to push and then raise or lower the bumper with the rocker switch 118 until the light 122 glows adjacent the tag listing the corresponding body type. The operator is assured that the bumper cushioning means 84 will contact the pushed vehicle at the proper height to prevent damage thereto.

The lift base 20, lift frame 46 and hydraulic cylinder 54 nested therein forms a very compact fore and aft structure. As mounted on a full size truck of United States manufacture, the lift base and lift frame combination are preferably less than one sixth of the lateral width of the frame and base excluding gussets 40 and brackets 42. The extension beyond the ends of the frame horns 16 is very limited thereby allowing the use of the rubber tired cushioning means 84 which itself has a very substantial overhang.

I claim:

1. A vertically moveable bumper comprising a lift base rigidly attachable to a vehicle frame, said lift base substantially vertical in orientation, a vertically moveable lift frame substantially vertical in orientation mounted on said lift base, a first set of guide means providing fore and aft positioning of the lift frame relative to the lift base, said first set of guide means comprising pads located between said lift frame and said lift base to accept fore and aft compressive loading therebetween during pushing engagement of the bumper and to provide sliding frictional engagement in unloaded condition, and rollers to retain said lift frame and lift base in said sliding frictional engagement, said rollers being unloaded during compressive fore and aft loading of the pads, a second set of guide means providing lateral positioning of the lift frame relative to the lift base, energizable means connecting said lift base to said lift frame and adapted to raise said lift frame relative to said lift base, and, remote control means operable to actuate said energizable means from within cab of said vehicle.

2. The bumper of claim 1 wherein said remote control means include height sensing means on said bumper adapted to sense the vertical position of the lift frame relative to the lift base and corresponding height signal means connected to the sensing means and viewable by the operator in the cab of the vehicle.

3. The bumper of claim 2 wherein said signal means comprise a plurality of lights each corresponding to the bumper height of one or more vehicle body styles and identification means associated with each of said lights identifying said body styles.

4. The bumper of claims 1 or 2 wherein said energizeable means includes a vertically positioned hydraulic cylinder, said lift frame being vertically supported on said lift base by said cylinder.

5. The bumper of claim 4 wherein said hydraulic cylinder is nested substantially within the assembled lift frame and lift base and attached therebetween to lift said frame without application of torque thereto about a horizontal axis.

6. The bumper of claims 1 or 2 wherein said lift frame includes means for retaining detachable cushioning means to said lift frame.

7. The bumper of claim 6 wherein said retaining means includes at least one horizontal member on said lift frame and at least one vertically oriented drop pin engageable with said horizontal member.

8. The bumper of claims 1 or 2 wherein the lateral width of said lift frame is more than six times the fore and aft depth of the assembled lift frame and lift base.

9. The bumper of claim 1 wherein said lateral guide means include rollers.

10. The bumper of claim 1 wherein said pads comprise a plastic material of sufficient compressive strength to accept fore and aft forces encountered in pushing a second vehicle.

11. A vertically moveable bumper comprising a lift base rigidly attachable to a vehicle frame, said lift base substantially vertical in orientation, a vertically moveable lift frame mounted on said lift base, a vertically positioned hydraulic cylinder connecting said lift base to said lift frame and adapted to raise said lift frame relative to said lift base without the application of torque about a horizontal axis to said lift frame, fore and aft guide means including pads providing sliding frictional engagement between said lift frame and said lift base when unloaded in fore and aft directions and compressive engagement between said lift frame and said lift base in fore and aft directions during pushing engagement of the bumper, and including rollers to retain said lift frame and lift base in said sliding frictional engagement, said rollers being unloaded during compressive fore and aft loading of the pads, and, height sensing means on said bumper and signal means viewable by the operator inside the cab of the vehicle and connected to the height sensing means, said height sensing means and signal means indicating the height of the lift frame to the operator.

* * * * *

UNITED STATES PATENT AND TRADEMARK OFFICE
CERTIFICATE OF CORRECTION

PATENT NO. : 4,437,696
DATED : March 20, 1984
INVENTOR(S) : Gerald J. Straub

It is certified that error appears in the above-identified patent and that said Letters Patent are hereby corrected as shown below:

Column 2, line 27: Delete "vertical" and substitute "vehicle".

Column 3, line 8: Delete "23" and substitute "22".

Signed and Sealed this

Twenty-sixth Day of June 1984

[SEAL]

Attest:

GERALD J. MOSSINGHOFF

Attesting Officer

Commissioner of Patents and Trademarks